United States Patent [19]

Snow

[11] Patent Number: 5,274,361
[45] Date of Patent: Dec. 28, 1993

[54] LASER OPTICAL MOUSE

[75] Inventor: Frank J. Snow, Annandale, Va.

[73] Assignee: The United States of America as represented by the Secretary of the Navy, Washington, D.C.

[21] Appl. No.: 756,261

[22] Filed: Aug. 15, 1991

[51] Int. Cl.$^5$ .............................................. G09G 3/02
[52] U.S. Cl. ........................................ 345/166; 356/5; 356/28; 324/171
[58] Field of Search ................ 340/710, 706; 382/859; 356/5, 27, 28, 28.5; 342/90, 99, 106; 324/160, 171

[56] References Cited

U.S. PATENT DOCUMENTS

| | | |
|---|---|---|
| 3,795,447 | 3/1974 | Welch . |
| 3,892,963 | 7/1975 | Hawley . |
| 3,987,685 | 10/1976 | Opocensky . |
| 4,527,894 | 7/1985 | Goede et al. ........................ 356/28 |
| 4,543,571 | 9/1985 | Bilbrey . |
| 4,578,674 | 3/1986 | Baker . |
| 4,730,929 | 3/1988 | Dausmann ........................ 356/28 |
| 4,751,505 | 6/1988 | Williams . |
| 4,794,384 | 12/1988 | Jackson . |
| 4,799,055 | 1/1989 | Nestler . |
| 4,801,931 | 1/1989 | Schmidtt . |
| 4,857,903 | 8/1959 | Zalenski . |
| 4,875,770 | 10/1989 | Rogers et al. ...................... 356/28.5 |
| 4,922,444 | 5/1990 | Baba . |
| 4,990,791 | 2/1991 | Nishi .................................. 250/561 |
| 4,995,720 | 2/1991 | Amzajerdian ......................... 356/5 |
| 5,054,912 | 10/1991 | Kuchel ................................. 356/5 |
| 5,100,230 | 3/1992 | Brownrigg et al. ................. 356/28 |

OTHER PUBLICATIONS

Nishihara, H., et al, "Optical-Fiber Laser Doppler Velocimeter for High-Resolution Measurement of Pulsatile Blood Flows," Applied Optics, vol. 21, No. 10, pp. 1785-1790, May 1982.

Toda, H. et al, "Optical Integrated Circuit for a Fiber Laser Doppler Velocimeter," Journal of Lightwave Technology, vol. Lt-5, No. 7, pp. 901-905, Jul. 1987.

Primary Examiner—Alvin E. Oberley
Assistant Examiner—Amare Mengistu
Attorney, Agent, or Firm—Alan P. Klein

[57] ABSTRACT

An apparatus for determining distance coordinates along two orthogonal axes for a computer system, where the coordinates represent the position of a cursor on a screen of a display unit of the computer system. The apparatus includes a pair of velocity detectors and an operating device such as a CPU. When the velocity detectors are moved by an operator, each of the velocity detectors detects velocities along a respective one of the orthogonal axes. The detected velocities are converted into moving distances representative of the coordinates through a calculation of the operating device.

23 Claims, 3 Drawing Sheets

LASER OPTICAL MOUSE

BACKGROUND OF THE INVENTION

This invention relates in general to an apparatus for determining distance coordinates, and more particularly to an apparatus for determining distance coordinates representative of the position of a cursor on a screen of a display unit of a computer system, for example.

A mouse is a device for determining distance coordinates for a computer system, where the coordinates represent the position of a cursor on the screen of a display unit of the computer system.

In a mechanical mouse, forward and backward and lateral motion of a roller ball over a pad having sufficient friction to assure rotation of the ball is converted by a mechanical mechanism into x and y equivalent mechanical translations. The mechanical translations are then converted into proportional x and y electrical signals which are fed by a cable to the display unit to serve as cursor-positioning input signals for the display.

Mechanical mouse devices incorporate moving parts that can wear out. The roller ball mechanism also requires periodic cleaning to remove accumulated dirt and to prevent internal malfunctioning.

An optical mouse device is an improvement over the conventional mechanical mouse device. In an optical mouse, forward and background and lateral motion takes place over a specially prepared pad having some characteristic such as an orthogonal array of fine reflecting lines which enables optical signal illumination of the pad by the mouse and subsequent processing of the reflected optical signal to provide cursor-positioning input signals for the display.

Although the optical mouse benefits by the absence of moving parts, it still requires a specially prepared pad that needs care and maintenance.

SUMMARY OF THE INVENTION

It is therefore one object of the invention to improve the determination of distance coordinates.

It is another object to provide an apparatus which can determine distance coordinates along two orthogonal axes without the use of either a specially prepared pad or moving parts.

These and other objects of the invention are achieved by an apparatus for determining distance coordinates along two orthogonal axes which comprises: (a) a pair of velocity-detecting means for detecting velocities along the two orthogonal axes by measuring the doppler shift of scattered light, wherein each of the velocity-detecting means detects velocities along a respective one of the two orthogonal axes and produces an output velocity signal, and (b) operating means for calculating the distance coordinates along the two orthogonal axes based on the output velocity signal of each of the velocity-detecting means.

Another aspect of the invention involves a method for determining distance coordinates along two orthogonal axes comprising the steps of: detecting velocities along one of two orthogonal axes by measuring the doppler shift of scattered light and producing an output velocity signal; detecting velocities along the other of the two orthogonal axes by measuring the doppler shift of scattered light and producing another output velocity signal; and calculating the distance coordinates along the two orthogonal axes based on the output velocity signals.

Additional advantages and features will become more apparent as the subject invention becomes better understood by reference to the following detailed description when considered in conjunction with the accompanying drawings wherein:

DETAILED DESCRIPTION

Figure 1:
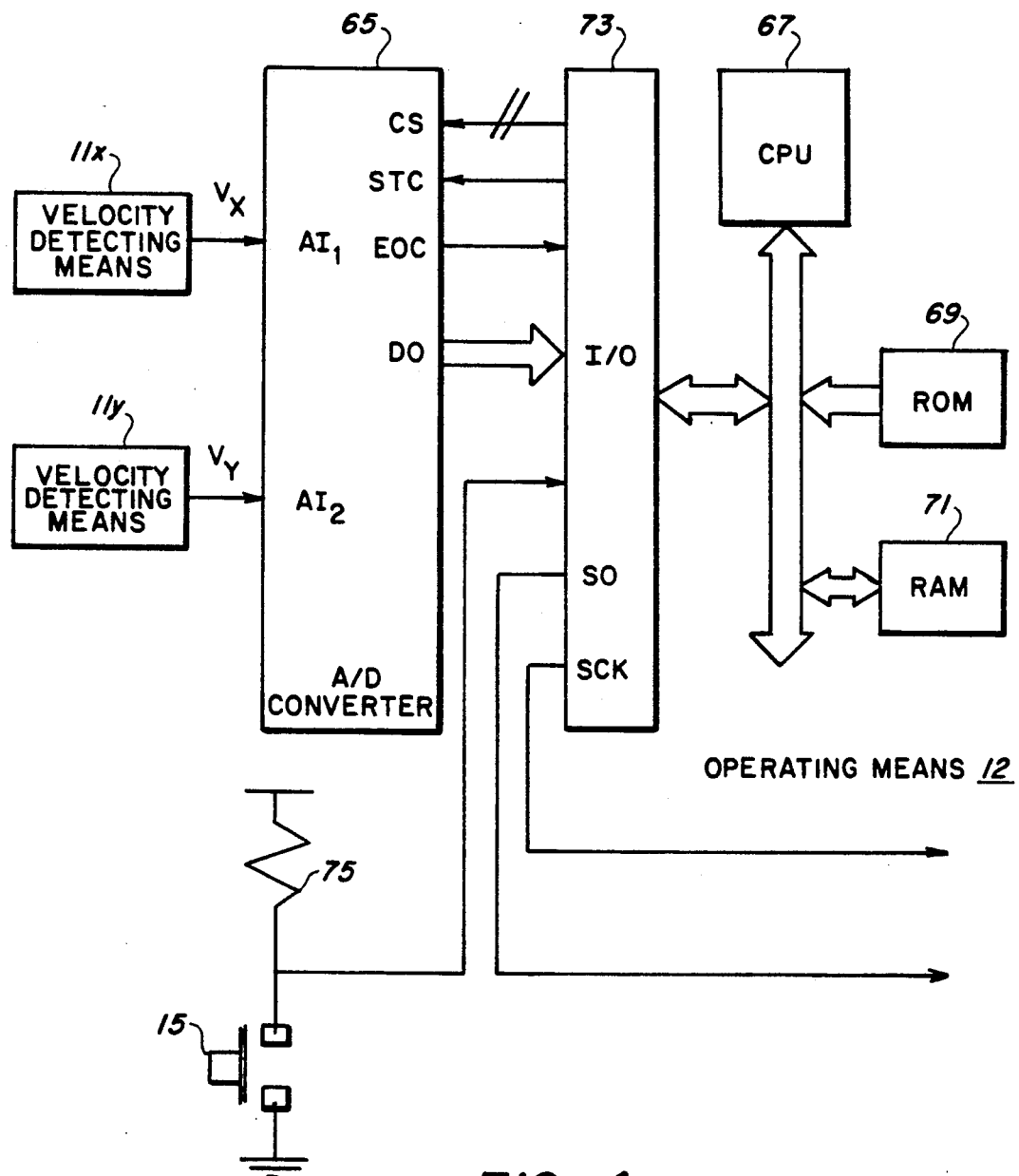
FIG. 1 is a block diagram of an apparatus for determining distance coordinates in accordance with the invention.

Referring to the drawings, wherein like reference numerals designate like or corresponding parts throughout the several views, FIG. 1 is a block diagram of an apparatus for determining distance coordinates according to the present invention. The apparatus includes a pair of velocity-detecting means $11x$, $11y$ for detecting velocities along two orthogonal axes by measuring the doppler shift of scattered light, and operating means 12 for calculating the distance coordinates along the two orthogonal axes based on an output velocity signal of each of the velocity-detecting means.

Figure 2:
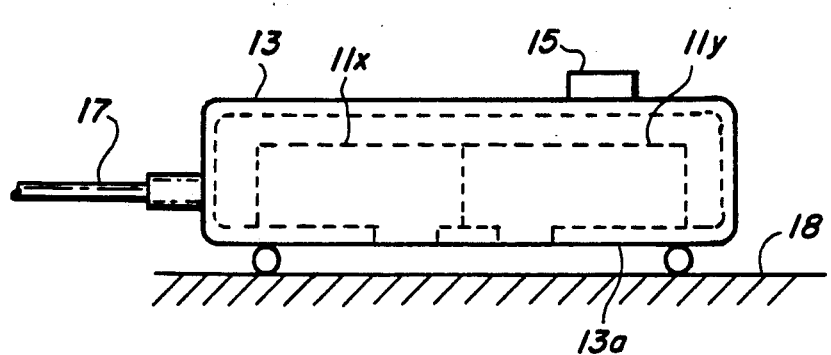
FIG. 2 is a side view showing an appearance of the apparatus shown in FIG. 1.

As shown in FIG. 2, the velocity-detecting means are provided within a case 13, and a push-button switch 15 for triggering the apparatus is fixed in the case 13 such that a portion sticks out of the frame of the case. A cable 17 is connected to a computer system (not shown). The case may rest on any stationary surface 18 not having a mirror finish.

Figure 3:
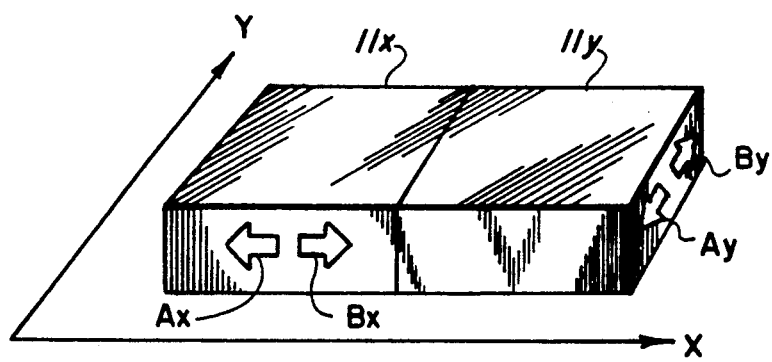
FIG. 3 is a perspective view showing velocity-detecting means used in the apparatus shown in FIG. 2.

As shown in FIG. 3, the velocity-detecting means $11x$ detects velocities thereof in directions $Ax$ and $Bx$, and the velocity-detecting means $11y$ detects velocities thereof in directions $Ay$ and $By$. The X and Y axes are representative of two-dimensional rectangular coordinates arranged as shown based on the bottom plane $13a$ of the case 13.

Figure 4:
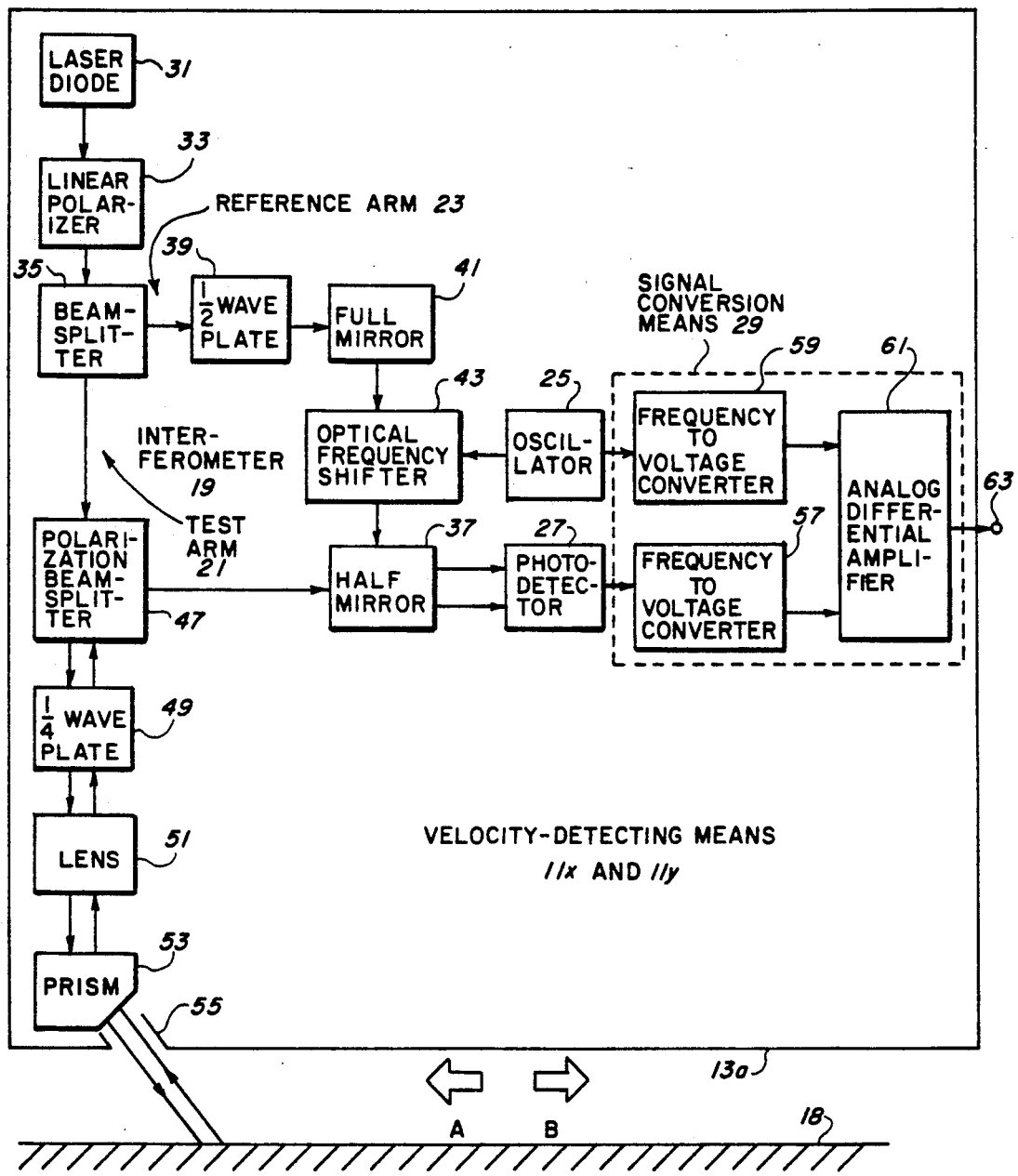
FIG. 4 is a block diagram of the velocity-detecting means shown in FIG. 3.

FIG. 4 shows the inner constitution of one of the velocity-detecting means $11x$ and $11y$. The velocity-detecting means includes an interferometer 19 having a test arm 21 and a reference arm 23, an oscillator 25 connected to the reference arm of the interferometer, a photodetector 27 such as an avalanche photodiode, for example, disposed at the output of the interferometer, and a signal conversion means 29 connected to the photodetector.

The interferometer 19 is employed to split a light beam from a monochromatic coherent light source, such as a laser diode 31, between the test arm 21 and the reference arm 23, to impart to the light in the test arm a doppler frequency shift whose sign and amplitude correspond respectively to the direction and magnitude of the velocity of the velocity-detecting means, and to recombine the split beam to form an interference pattern on the face of the photodetector 27. While the interferometer 19 may take a variety of forms, conveniently it may take the form illustrated in FIG. 4 of a linear polarizer 33, a beamsplitter 35 disposed behind the linear polarizer, a test arm 21 and a reference arm 23 disposed behind the beamsplitter, and a half-mirror 37 disposed behind the test and reference arms. The test arm may comprise, for example, a polarization beamsplitter 47 disposed behind the beamsplitter 35, a quarter-wave plate 49 disposed behind the polarization beamsplitter, a lens 51 disposed behind the quarter-wave plate, and a prism 53 disposed behind the lens and in front of an opening 55 in the bottom plane 13a of the case 13. The reference arm may comprise, for example, a half-wave plate 39 disposed behind the beamsplitter 35, a full mirror 41 disposed behind the half-wave plate, and an optical frequency shifter 43, such as a Bragg cell, for example, disposed behind the full mirror and connected to the oscillator 25.

The signal conversion means 29 is employed to convert the AC photodetector output signal to a DC signal whose polarity and amplitude correspond respectively to the direction and magnitude of the velocity of the velocity-detecting means. While signal conversion means 29 may take a variety of forms, conveniently it may take the form illustrated in FIG. 4 of a first frequency-to-voltage converter 57 connected to the photodetector 27, a second identical frequency-to-voltage converter 59 connected to the oscillator 25, and an analog differential amplifier 61 connected to the frequency-to-voltage converters 57 and 59.

The frequency-to-voltage converters may comprise, for example, either (1) spectrum analyzers, (2) time-sampling frequency counters based upon counting, for example, the number of positive-direction zero crossings of the sinusoidal signal over a unit time base, or the number of sine-wave-synchronous generated pulses over a unit time base, or (3) the various types of fixed-time sinusoidal or pulse signal integrators whose integration output can be provided as a final frequency-proportional analog or digital signal output.

In operation, the laser diode 31 produces a light beam of frequency $F_R$. The linear polarizer 33 linearly polarizes it and the beamsplitter 35 splits the linearly-polarized beam between the test arm 21 and the reference arm 23 of the interferometer 19. In the test arm, the polarization beamsplitter 47 passes the light directly to the quarter-wave plate 49 which rotates its polarization by 90 degrees, the lens 51 focuses it, and the prism 53 redirects it through the opening 55 in the bottom of the case 13 onto the non-mirror-like stationary surface 18 upon which the case rests. The diffusely back-scattered return beam from the surface 18 is received by the prism 53, the lens 51 focuses it, the quarter-wave plate 49 rotates its polarization by 90 degrees, and the polarization beamsplitter 47 redirects it onto the half-mirror 37.

When the case 13 housing each of the velocity-detecting means 11x and 11y is moved as shown in FIG. 4 in the direction A or B relative to the stationary surface 18 upon which it rests, the surface imparts an additional doppler frequency shift $F_D$ to the back-scattered return beam in the test arm whose sign and amplitude correspond respectively to the direction and magnitude of the velocity of the velocity-detecting means.

In the reference arm, the half-wave plate 39 rotates the polarization of the beam by 90 degrees, the full mirror 41 redirects the beam, and the optical frequency shifter 43, in response to an AC offset signal of frequency $F_{RO}$ from the oscillator 25, imparts an offset frequency shift $F_{RO}$ to the beam and directs it onto the half-mirror 37. The quantity $F_{RO}$ is a number greater than the maximum positive doppler frequency shift $F_D$ to be obtained as a result of the maximum anticipated velocity of the velocity-detecting means in the defined positive direction of motion. This assures that when the difference between $F_{RO}$ and $F_D$ is taken later, it will be a positive number, no matter what the sign of $F_D$ may be.

The half-mirror 37 recombines the split beams to form an interference pattern on the face of the photodetector 27. The photodetector 27 responds to the interference pattern on its face by producing an AC electrical signal whose frequency is the difference between the offset frequency shift $F_{RO}$ and the doppler frequency shift $F_D$. The frequency-to-voltage converter 57 converts the AC photodetector output signal to a first DC voltage signal whose amplitude is the product of a proportionality constant K and the difference between the offset frequency shift $F_{RO}$ and the doppler frequency shift $F_D$. The frequency-to-voltage converter 59 converts the AC offset signal of frequency $F_{RO}$ from the oscillator 25 to a second DC voltage signal whose amplitude is the product of the proportionality constant K and the offset frequency shift $F_{RO}$. Finally, the analog differential amplifier 61 subtracts the first and second DC voltage signals to obtain a DC signal whose amplitude is the product of another proportionality constant K' and the doppler frequency shift $F_D$. The polarity (positive or negative) and amplitude of this DC signal correspond respectively to the direction and magnitude of the velocity of the velocity-detecting means. The output voltage of the analog differential amplifier 61 is outputted via a detection terminal 63 to the operating means 12. More specifically, the X-direction velocity-detecting means 11x outputs a velocity-detecting signal $V_x$ and the Y direction velocity-detecting means 11y outputs a velocity-detecting signal $V_y$.

While the operating means 12 may take a variety of forms, conveniently it may take the form illustrated in FIG. 1 of a two channel analog-to-digital (A/D) converter 65, a central processing unit (CPU) 67 for performing operations and controls, a read only memory (ROM) 69 for pre-storing programs which will be executed by the CPU, a random access memory (RAM) 71 for storing data, and an input/output port (I/O) circuit 73 for transferring data with an external device (not shown).

The velocity-detecting signals outputted from the velocity-detecting means 11x and 11y are respectively supplied to analog input terminal $AI_1$ and $AI_2$ of the two-channel analog-to-digital (A/D) converter 65. This A/D converter 65 can accept and function with input signals having both positive and negative polarities. More specifically, the A/D converter 65 outputs velocity-detecting data of eight bits constituted by data of one bit representative of the polarity of the velocity-detecting signal and data of seven bits corresponding to an absolute value of the velocity-detecting signal. Such velocity-detecting data are outputted from a digital output terminal DO of the A/D converter 65.

The I/O circuit 73 supplies channel data CS and a start signal STC for an analog-to-digital conversion to the A/D converter 65 based on a certain command of the CPU 67. Thereafter, when the A/D converter 65 supplies the end signal EOC for the analog-to-digital conversion to the I/O circuit 73, the I/O circuit 73 inputs and outputs the velocity-detecting data (outputted from the data output terminal DO of the A/D converter 65) To the CPU 67.

An on/off signal (representative of the on/off states of the push button switch 15) is supplied to the CPU 67 via the I/O circuit 73. This I/O circuit 73 provides a serial output terminal SO and a serial clock terminal SCK, whereby parallel data outputted from the CPU 67 are converted to serial data and such serial data are outputted in synchronism with a serial clock signal. Such serial data are supplied to the computer system via the cable 17 (shown in FIG. 2). In FIG. 1, 75 designates a pull-up resistor In operation, the operator holds and moves the case 13 in right and left directions, and in forward and backward directions, for example. In this instance, the X-direction velocity-detecting means 11x outputs the velocity-detecting signal Vx corresponding to the moving velocities thereof in the right and left directions, and the Y-direction velocity-detecting means 11y outputs the velocity-detecting signal Vy corresponding to the velocities thereof in the forward and backward directions.

Meanwhile, the I/O circuit 73 sequentially outputs the start signal STC and the channel selecting data CS to the A/D converter 65 based on the command of the CPU 67. The A/D converter 65 sequentially converts the velocity-detecting signals Vx and Vy (respectively supplied to the analog input terminals AI1 and AI2) into respective velocity-detecting data, and such data are supplied to the I/O circuit 73. The CPU 67 inputs the velocity-detecting data sequentially supplied to the I/O circuit 73, and the CPU 67 sequentially integrates the velocity-detecting data so as to calculate displacement data. More specifically, the CPU 67 sequentially calculates two sets of displacement data respectively for the X and Y directions.

Next, each of the two sets of displacement data in the X and Y directions are supplied to the I/O circuit 73 wherein the two sets of displacement data are outputted from the serial output terminal SO in series. In this case, these displacement data are outputted from the I/O circuit 73 in synchronism with the serial clock signal outputted from the serial clock terminal SCK. In addition, the CPU 67 inputs the on/off signal of the push button switch 15 at a desirable timing. This on/off signal with the displacement data are both outputted from the serial output terminal SO of the I/O circuit 73.

As described above, the apparatus for determining distance coordinates detects the velocities respectively in the X and Y directions of the two dimensional rectangular coordinates based on the bottom plane 13a of the case 13. Based on detecting the velocities, the apparatus calculates moving distances in the X and Y directions and outputs data representative of such moving distances. The apparatus does not require either a specifically prepared pad or moving parts.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. An apparatus for determining distance coordinates along two orthogonal axes comprising:
   (a) a pair of velocity-detecting means for detecting velocities along the two orthogonal axes by measuring the doppler shift of scattered light, wherein each of the velocity-detecting means detects velocities along a respective one of the two orthogonal axes and produces an output velocity signal; and
   (b) operating means for calculating the distance coordinates along the two orthogonal axes based on the output velocity signal of each of the velocity-detecting means.

2. The apparatus recited in claim 1 wherein each of the velocity-detecting means includes:
   an interferometer having a test arm and a reference arm for splitting a monochromatic coherent light beam between the two arms, for imparting to the light in the test arm a doppler frequency shift whose sign and magnitude correspond respectively to the direction and magnitude of the velocity of the velocity-detecting means, and for recombining the split beam to form an interference pattern.

3. The apparatus recited in claim 2 wherein each of the velocity-detecting means includes:
   a photodetector disposed at the output of the interferometer and responsive to the forming of the interference pattern for producing an AC photodetector output signal.

4. The apparatus recited in claim 3 wherein each of the velocity-detecting means includes:
   signal conversion means connected to the photodetector for converting the AC photodetector output signal to a DC signal whose polarity and amplitude correspond respectively to the direction and magnitude of the velocity of the velocity-detecting means.

5. The apparatus recited in claim 4 wherein each of the velocity-detecting means includes:
   an oscillator connected to the reference arm of the interferometer for producing an AC offset signal.

6. The apparatus recited in claim 5 wherein the signal conversion means includes:
   a first frequency-to-voltage converter connected to the photodetector for converting the AC photodetector output signal to a first DC voltage signal.

7. The apparatus recited in claim 6 wherein the signal conversion means includes:
   a second frequency-to-voltage converter connected to the oscillator for converting the AC offset signal to a second DC voltage signal.

8. An apparatus for determining distance coordinates along two orthogonal axes comprising:
   (a) a pair of velocity-detecting means for detecting velocities along two orthogonal axes, wherein each of the velocity-detecting means detects velocities along a respective one of the two orthogonal axes and produces an output velocity signal and includes:
      (i) an interferometer having a test arm and a reference arm for splitting a monochromatic coherent light beam between the two arms, for imparting to the light in the test arm a doppler frequency shift whose sign and magnitude correspond respectively to the direction and magnitude of the velocity of the velocity-detecting means, and for recombining the split beam to form an interference pattern;
      (ii) a photodetector disposed at the output of the interferometer and responsive to the forming of the interference pattern for producing an AC photodetector output signal;
      (iii) an oscillator connected to the reference arm of the interferometer for producing an AC offset signal;
      (iv) a first frequency-to-voltage converter connected to the photodetector for converting the AC photodetector output signal to a first DC voltage signal;

(v) a second frequency-to-voltage converter connected to the oscillator for converting the AC offset signal to a second DC voltage signal; and (vi) an analog differential amplifier connected to the first and second frequency-to-voltage converters for subtracting the first and second DC voltage signals; and (b) operating means for calculating the distance coordinates along the two orthogonal axes based on the output velocity signal of each of the velocity-detecting means.

9. The apparatus recited in claim 8 wherein the interferometer includes:

a diode laser.

10. The apparatus recited in claim 9 wherein the interferometer includes:

a linear polarizer disposed behind the laser for linearly polarizing the laser beam.

11. The apparatus recited in claim 10 wherein the interferometer includes:

a beamsplitter disposed behind the linear polarizer for splitting the laser beam between the test arm and the reference arm.

12. The apparatus recited in claim 11 wherein the interferometer includes:

a half-mirror for recombining the split beams to form an interference pattern.

13. The apparatus recited in claim 12 wherein the reference arm of the interferometer includes:

a half-wave plate disposed behind the beamsplitter for rotating the polarization of the laser beam by 90 degrees.

14. The apparatus recited in claim 13 wherein the reference arm of the interferometer includes:

a full mirror disposed behind the half-wave plate for redirecting the laser beam.

15. The apparatus recited in claim 14 wherein the reference arm of the interferometer includes:

an optical frequency-shifter disposed behind the full mirror and connected to the oscillator for imparting an offset frequency shift to the laser beam and directing the laser beam onto the half-mirror.

16. The apparatus recited in claim 12 wherein the test arm includes:

a polarization beamsplitter disposed behind the beamsplitter for directly passing the laser beam and for redirecting a 90 degree polarization-rotated return beam onto the half-mirror.

17. The apparatus recited in claim 16 wherein the test arm includes:

a quarter-wave plate disposed behind the polarization beamsplitter for rotating the polarization of the directly passed laser beam by 45 degrees and for rotating the polarization of the return beam by 45 degrees.

18. The apparatus recited in claim 17 wherein the test arm includes:

a lens disposed behind the quarter-wave plate for focusing the directly-passed laser beam and the return beam.

19. The apparatus recited in claim 18 wherein the test arm includes:

a prism disposed behind the lens for redirecting the directly-passed laser beam onto an external stationary surface and for receiving a doppler frequency-shifted return beam.

20. A method for determining distance coordinates along two orthogonal axes comprising the steps of:

detecting velocities along one of two orthogonal axes by measuring the doppler shift of scattered light and producing an output velocity signal;

detecting velocities along the other of the two orthogonal axes by measuring the doppler shift of scattered light and producing another output velocity signal; and calculating the distance coordinates along the two orthogonal axes based on the output velocity signals 21. The method recited in claim 20 wherein each velocities-detecting step includes the steps of:

splitting a monochromatic coherent light beam into two parts;

imparting to one part of the beam a doppler frequency shift whose sign and magnitude correspond respectively to the direction and magnitude of the velocity; and recombining the split beam to form an interference pattern.

22. The method recited in claim 21 wherein each velocities-detecting step includes the step of:

producing an AC photodetector output signal in response to the formation of the interference pattern.

23. The method recited in claim 22 wherein each velocities-detecting step includes the step of:

converting the AC photodetector output signal to a DC signal whose polarity and amplitude correspond respectively to the direction and magnitude of the velocity.

* * * * *